United States Patent [19]
Cochran et al.

[11] 3,823,822
[45] July 16, 1974

[54] PUSHUP GAUGE

[75] Inventors: Ronald Cochran, Roxana; August J. Federle, Godfrey; Samuel W. Marsh, III, Alton, all of Ill.

[73] Assignee: Owens-Illinois, Inc., Toledo, Ohio

[22] Filed: May 7, 1973

[21] Appl. No.: 357,685

[52] U.S. Cl.................................. 209/80, 209/82
[51] Int. Cl................................................. B07c
[58] Field of Search............ 209/88, 90, 80, 82, 73, 209/74

[56] References Cited
UNITED STATES PATENTS

| | | | |
|---|---|---|---|
| 2,293,586 | 8/1942 | Bardet et al. | 209/88 R |
| 3,407,931 | 10/1968 | Vincent | 209/80 |

*Primary Examiner*—Allen N. Knowles
*Attorney, Agent, or Firm*—Steve M. McLary; E. J. Holler

[57] ABSTRACT

An inspection device for glass containers to check for bottom pushup height, more particularly, to check for those containers having a rejectably flat pushup or a rounded bottom and therefore unstable characteristics during handling and filling, the device being adaptable for incorporation into a multistation automatic container inspection apparatus. A probe shaft is positioned below the center of the container and mounted in an elevating apparatus to move the probe shaft upward into contact with the container. The design allows for relative downward movement between the probe and the elevating apparatus when the upward movement of the probe is restricted by the container before the elevating apparatus completes its upward travel. An open switch made of one contact point on the probe and a second on the elevating apparatus is set open a distance determined by the minimum allowable height of a container bottom pushup, and the level beyond that height to which the probe is set to travel, that distance then being the amount of allowable relative motion before the switch is closed. When the switch is closed, an electrical circuit is completed, activating an indicator device to signal that a defective container is in the device, or activating an automatic discharge mechanism to dispose of the container.

15 Claims, 4 Drawing Figures

PUSHUP GAUGE

BACKGROUND OF THE INVENTION

1. Field of the Invention

This disclosure relates generally to apparatus for checking dimensions of glass containers and, more particularly, to apparatus for detecting glass containers having a bottom pushup with insufficient height, or which are actually rounded on the bottom. The apparatus may be used singularly for checking individual containers or in combination with an automatic inspection device, either singularly or in addition to other inspection apparatus for detection of other types of defects, and including an automatic discharge station for diverting defective containers to an appropriate location. The apparatus includes a support for a container to be inspected, a probe vertically movable into and out of position for contact with the pushup of the glass container, automatic or manual equipment to move the probe up into inspection position when a container is in inspection alignment over the probe, a contact switch which is closed if the probe movement is restricted by a rejectable flat pushup completing an electrical circuit which either activates an indicator device to alert the operator that the container is defective, or activates an automatic discharge device to dispose of the container.

2. Description of the Prior Art

Modern high-speed manufacturing processes for glass containers have resulted in a problem relating to cost in inspection of the containers. Manual techniques are slow and costly, yet with improvements in related areas such as mechanical filling, capping, handling, etc., the quality demands have increased for uniformity and defect-free ware. Automatic inspection equipment is available as shown in U.S. Pat. No. 3,313,409, but present equipment does not allow for inspection of containers for pushup flatness. The bottom of glass containers is curved upward for manufacturing needs, strength, and to lessen the effect of normal variation in shape on the stability of the container as it stands upright on a flat surface. This upraised bottom is called the pushup, and, if overheated, may sag below the level of the designed contact surface or become so aligned with it as to make the bottle or jar a "rocker" which is unstable on a flat surface. Also a "rocker" will not easily stack on shelves in the home. It is desirous to eliminate or sort out such containers, since, in automatic processing, they have a greater tendency to overturn or cause malfunctions in filling and capping equipment. The apparatus disclosed is adjustable to accommodate different sizes of containers and may be used by itself in a manual operation, or singly in an automatic operation, or in combination with other automatic equipment. It is designed as well not to damage the ware being inspected.

SUMMARY OF THE INVENTION

An apparatus for inspecting the bottom of a glass container to detect a rejectably flat pushup with means to support the container during inspection and a probe-like device which is moved up to sense the height of the pushup. In addition, equipment is included to sense when a rejectable container has been gauged and indicate that condition.

DESCRIPTION OF THE PREFERRED EMBODIMENT

Figure 1:
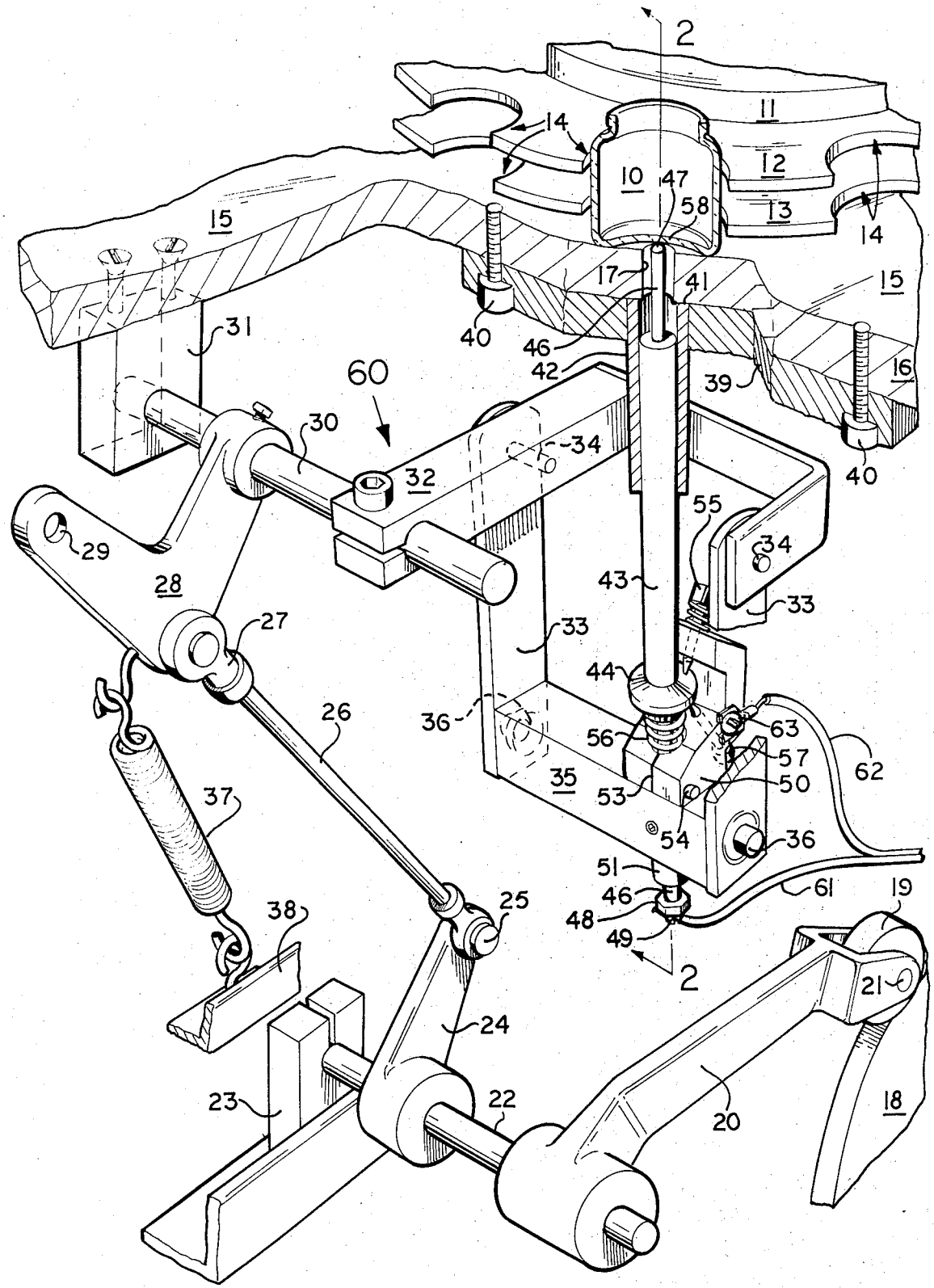
FIG. 1 is a perspective view, partly in section, of the operative portions of an apparatus embodying the invention.

Referring to FIG. 1, an apparatus is shown for automatically inspecting glass containers for rejectably flat or insufficient pushup height. A glass container 10 is located on the top surface 15 of a container support means 16 formed generally from standard plate or sheet material. The container support means 16 is adjacent to an indexing head 11 fitted with two parallel annular disks or plates 12 and 13. At intervals around the circumference of plates 12 and 13 are aligned pockets 14 used as indexing movement guides for the container 10. The container handling equipment may be of a common variety as shown in U.S. Pat. No. 3,313,409, referred to generally in the art as a starwheel. The indexing head sequentially moves the container 10 circumferentially as the indexing head is rotatably indexed by equipment not shown. The container 10 is brought into inspection alignment by sliding on the surface 15 to a position centered over a vertical opening 17 in the container support means 16.

When the indexing head 11 is rotated, a rotating cam means 18 is also rotated in unison by apparatus not shown. The cam 18 has high and low areas formed therein, the high areas contacted by cam follower 19 when the indexing head 11 is indexing, and the low areas are contacted when the indexing head 11 is in position for gauging. The cam follower 19 is mounted for rotational movement on a crank 20 by means of a bearing shaft 21. Crank 20 is rigidly mounted to a rotatable shaft 22 which is, in turn, mounted for rotation at a bearing mount 23.

Deflection of the cam follower 19 therefore results in angular deflection of the crank 20, which is transmitted to a second crank 24, which is also attached to the shaft 22. At one end of the crank 24 is a rotary connection 25 connecting with a push rod 26. The push rod 26 connects to a bell crank 28 at its other end by means of a rotary connection 27. The bell crank 28 may be used to provide mechanical motion for actuating other inspection devices by connecting to the bell crank 28 at an opening 29.

The bell crank 28 is rigidly attached to a rotatable horizontal shaft 30 mounted for rotary movement in a bracket 31 mounted on the underside of the container support means 16 so that angular movement of the bell crank 28 results in rotation of the shaft 30.

An arm means 32 is rigidly attached to the shaft 30, being mounted substantially horizontal and perpendicular to the shaft 30.

Probe support hangers 33 are hingedly connected to the arm means 32 by bearing pins 34. (In FIG. 1, one of the hanger means 33 is broken away between its ends). The shape of the arm means 32 provides for uniform lifting force to be imparted through the hangers 33 to a probe support means 35, which takes the general form of an elongated block that is rotatably connected at its ends to the lower ends of the hangers 33 by a pair of spaced, coaxially aligned horizontal bearing pins 36.

The above-described elevating means, generally shown as 60, therefore works by an oscillating angular motion of the crank 20 as the cam means 18 rotates synchronously with the indexing head 11. This moves the probe support means 35 up and down through a distance proportional to the amplitude of the high and low areas on the cam means 18. A spring means 37 is connected between the bell crank 28 and a fixed mount 38 to provide a biasing force extending through the pushrod 26, the rotatable shaft 22, and the crank 20 to assure that the cam follower 19 will remain in contact with the cam means 18.

Figure 2:
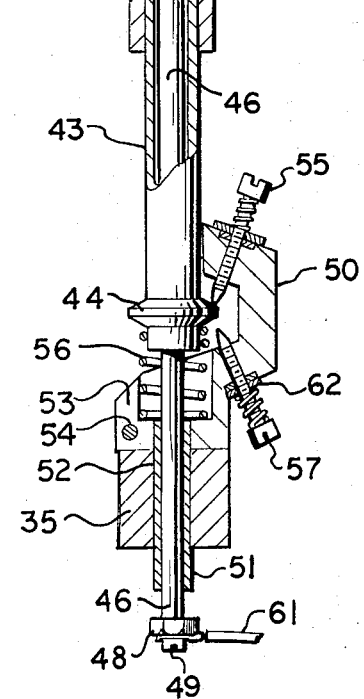
FIG. 2 is an elevation view, partly in section, of a portion of the apparatus shown in FIG. 1, taken along the line A—A of FIG. 1.

An upper bracket 39 is attached to the underside of the container support means 16 by threaded fasteners 40 or the like. A guide opening 41 is formed in the upper bracket 39, concentric with the vertical opening 17 in the container support means 16. A vertical guide bushing 42 is fitted in the guide opening 41 and serves as a slidable guide for a vertical shaft 43. The shaft 43 is formed, intermediate its length, with an outwardly extending flange 44, and has an upper threaded opening 45 (see FIG. 2) and continuous bore formed the length thereof to accommodate a threaded rod 46. Threaded rod 46 has a probe tip 47 mounted on the upper end thereof for contact with the container.

Figure 3:
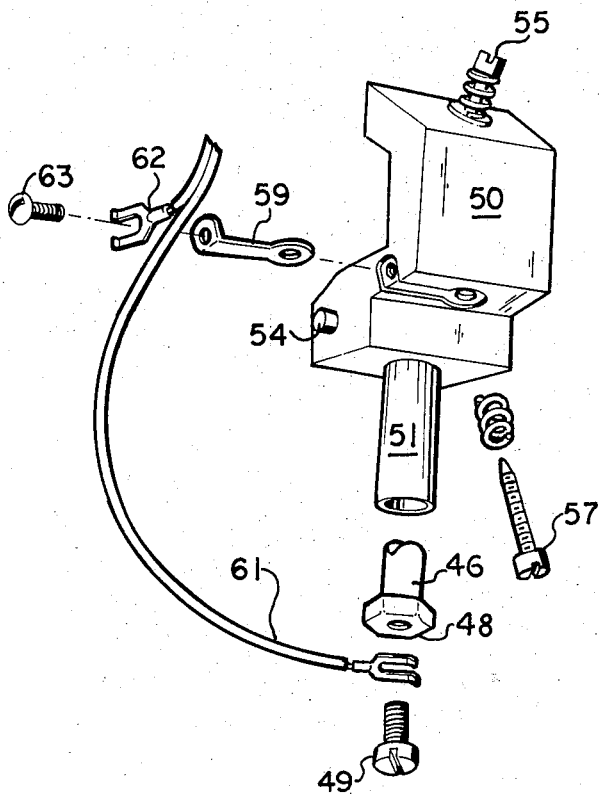
FIG. 3 is an exploded perspective view, on an enlarged scale, of a portion of the apparatus shown in FIG. 2, illustrating the location of the electrical connections.

Threaded rod 46 is fitted with a hexagonal screw head 48 at its lower end to rotate the threaded rod 46 and thereby adjust the rod 46 up or down with respect to the hollow shaft 43 as a further adjustment when changing from 1° of container pushup to another container with a different minimum pushup. Also, at the bottom end of the rod 46 is a provision for an electrical contact connection consisting of a means 49 (seen best in FIGS. 2 and 3), such as a screw and standard sheet metal conductor fixed to the end of a wire or lead 61.

A switch contact support bracket 50 made of non-conductive material is included which forms a mount for a guide bushing 51. The bushing 51 serves to align the lower end of the threaded rod 46. The bushing 51 also serves as a fitting for mounting the switch contact support bracket 50 on probe support means 35 by engagement with an opening 52 formed in the probe support means 35. Guide bushing 51 is mounted in switch contact support bracket 50 by way of a slotted opening 53 therein and a clamping bolt 54.

An adjustable stop means is included to contact the top surface of flange 44 on shaft 43. This is shown as a set screw 55 and serves to position the probe tip 47 when the elevating means 60 is cycling the probe support means 35 downward during indexing of the indexing head 11. It is desirable to assure clearance from the probe tip 47 for the container as it is indexed by indexing head 11 and moves over the surface 15 of the container support means 16. This clearance is also adjustable through design of the cam 18 and the radial distance of the high points thereon.

Shaft 43 and flange 44 are biased upward against the adjustable stop 55 by a coil spring 56 acting between the switch contact support bracket 50 and the bottom of the flange 44. This spring 56 also supports the weight of the shaft 43, rod 46, and flange 44.

In the switch contact support bracket 50 is an adjustable sensing switch contact 57, spaced from the bottom surface of flange 44. This spacing is a distance determined by subtracting the minimum allowable height of the container bottom pushup 58 above the support top surface 15 from the level beyond that minimum allowable height to which the probe tip 47 will be moved by the elevating mechanism 60. If a rejectably flat pushup is gauged, the threaded rod 46 and the shaft 43 will be restrained by the pushup and the elevating means 60 will continue to move the switch contact support bracket 50 upwards compressing coil spring 56 until contact is made between the bottom of flange 44 and the adjustable sensing switch contact 47.

The pickup or signal initiating portion of an electrical circuit is shown as wires 61 and 62 connected respectively, to the electrical contact means 49 on rod 46 and to the adjustable sensing switch contact 57 through a conductive strap 59 (shown in FIG. 3) which is fastened to the block 50 by a conductive screw 63; the lead 62 being interposed between the head of screw 63 and the strap 59.

Figure 4:
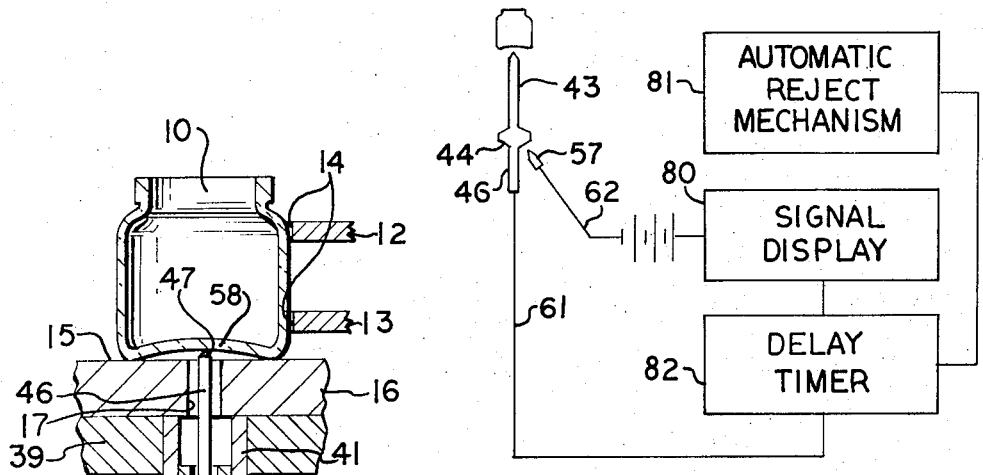
FIG. 4 is a schematic diagram showing the electrical circuit disclosed in the invention.

The schematic circuit diagram of FIG. 4 becomes operative upon the closing of the contacts 57 and 44 during inspection of a rejectable container. Closing of the contacts activates a signal display device 80 which may be audio or visual to alert the operator that a rejectable container has been found. Where, as in this disclosure, the automatic feeding of containers 10 by the indexing head 11 is employed, the completed circuit may be used to activate a mechanism 81 to automatically reject the defective bottle or jar at a reject station. However, it must be noted that the reject mechanism 81 is generally located at a subsequent station in the sequence of indexing of the head 11. Therefore, a reject signal must be transferred to the reject mechanism 81 at the proper time after the container has been inspected, and a delay timer 82 is employed for that purpose, acting in unison with the indexing head 11.

We claim:

1. An apparatus for inspecting the height of the pushup in the bottom of glass containers, comprising:

a. container support means;
    b. an upper bracket mounted on the underside of said container support means;
    c. a bushing extending vertically through said upper bracket and through said container support means;
    d. a hollow shaft with interior threads extending vertically through and mounted for slidable engagement with said vertical bushing, said hollow shaft made of electrically conductive material;
    e. a threaded adjustable rod mounted within said hollow shaft and extending upwardly beyond the top of said hollow shaft, said threaded rod also extending downward beyond the bottom of said hollow shaft;
    f. means on said downward end of said threaded rod for adjusting the rod up or down relative to said hollow shaft by rotating said threaded rod relative to said hollow shaft;
    g. elevating means connected to said shaft and rod to move said shaft and rod upward to sense the pushup height of a container located on said support means; and h. signal means cooperating with said shaft and rod to indicate a container with a rejectable pushup.

2. The apparatus of claim 1, further including a probe tip mounted on the upper end of said threaded adjustable rod for non-destructive contact with the bottom of glass containers.

3. An apparatus for inspecting the height of the pushup in the bottom of glass containers, comprising:

a. container support means;

b. an upper bracket mounted on the underside of said container support means;

c. a bushing extending vertically through said upper bracket and through said container support means;

d. a hollow shaft with interior threads extending vertically through and mounted for slidable engagement with said vertical bushing, said hollow shaft made of electrically conductive material;

e. a threaded adjustable rod mounted within said hollow shaft and extending upwardly beyond the top of said hollow shaft, said threaded rod also extending downward beyond the bottom of said hollow shaft;

f. means on said downward end of said threaded rod for adjusting the rod up or down relative to said hollow shaft by rotating said threaded rod relative to said hollow shaft;

g. a probe tip mounted on the upper end of said threaded rod for nondestructive contact with the bottom of glass containers;

h. elevating means connected to said shaft and rod to move said shaft and rod upward to sense the pushup height of a container located on said support means;

i. a radially extending flange formed on the lower portion of said shaft;

j. switch contact support means mounted below said upper bracket, formed with a guide therein for slidable engagement with the lower portion of said shaft, said switch contact support means formed from material having electrical insulating properties;

k. means on said switch contact support means for vertically biasing said flange, said hollow shaft, and said rod upwards;

l. adjustable stop means mounted in said switch contact support means and positioned to contact the upper surface of said flange and position said hollow shaft and rod vertically against said biasing means, said biasing means thereby acting between said switch contact support means and said flange; and m. adjustable sensing switch means positioned to complete an electrical circuit should said rod and hollow shaft and flange be depressed downward against said biasing means beyond a predetermined distance, that distance determined by subtracting the minimum allowable height of a container bottom pushup above said container support means from the level beyond said minimum allowable pushup height to which said shaft, rod, and probe tip will be moved by said elevating means.

4. The apparatus of claim 3, wherein said vertical biasing means comprises a coiled spring acting between said lower bracket and the bottom surface of said flange.

5. The apparatus of claim 3, wherein said adjustable stop means comprises an adjustable set screw positioned downward to contact the upper surface of said flange, said set screw mounted in said switch contact support means and extending downward therefrom.

6. The apparatus of claim 3, wherein said adjustable sensing swtich means comprises:

a. an adjustable set screw of electrically conductive material positioned on said switch contact support means below the lower surface of said flange a distance determined by subtracting the minimum allowable height of a container bottom pushup above said container support means from the level beyond said minimum allowable pushup height to which said shaft, rod, and probe tip will be moved by said elevating means; and b. electrical contact means at the extreme lower end of said threaded rod electrically connected in series circuit arrangement to a voltage source, said source similarly connected to said adjustable set screw, the circuit therein completed through said threaded rod into said hollow shaft and flange to said adjustable set screw when said threaded rod and hollow shaft are depressed against said biasing means by a rejectably flat container pushup into contact with said adjustable set screw as said probe means is moved upwards by said elevating means.

7. The apparatus of claim 6, wherein said signal means comprises a visual or audio indicator connected in series with said voltage source, said indicator being activated when said circuit is closed by contact between said flange and said adjustable set screw.

8. The apparatus of claim 1, wherein said elevating means comprises:

a. a bracket mounted on the underside of said container support means;

b. a shaft rotatably mounted in said bracket and extending horizontally therefrom;

c. crank means connected to said horizontal shaft to rotate said horizontal shaft through a limited and adjustable arc of travel;

d. arm means mounted at one end on said horizontal shaft, extending horizontally from and perpendicular to said horizontal shaft, for angular movement in a vertical plane with rotation of said horizontal shaft;

e. probe support hanger means hingedly attached to said arm means at the end opposite said shaft and extending downward therefrom for vertical movement with rotation of said horizontal shaft and angular displacement of said arm means, said probe means hingedly attached to said probe support hanger means, and extending upwardly through said container support means, said probe means thereby capable of vertical sliding movement, without horizontal displacement, upon rotation of said horizontal shaft by said crank means; and f. motor means to oscillate said crank means and move said probe means upward to sense the height of the pushup of a container located on said support means, and lower said probe means out of engagement with said container pushup.

9. In an apparatus for inspecting glass containers, wherein the containers are moved by a conveyor toward a table and into an indexing head having a plurality of circumferentially spaced pockets mounted for rotation whereby said pockets are successively moved from the position overlying said table to spaced points along the periphery of said indexing head at which points are located a plurality of inspection devices and including a reject station responsive to a signal from one of the inspection stations to discharge a defective container, an apparatus for one of said inspection devices to check for bottom pushup height, comprising:

a. container support means;
b. a hollow shaft with interior threads extending vertically and mounted for slidable engagement with said container support means;
c. a threaded adjustable rod mounted within said hollow shaft and extending upwardly beyond the top of said hollow shaft, said threaded rod also extending downward beyond the bottom of said hollow shaft; and
d. means on said downward end of said threaded rod for adjusting the rod up or down relative to said hollow shaft by rotating said threaded rod relative to said hollow shaft;
e. elevating means connected to said shaft and rod to move said shaft and rod upward to sense the pushup height of a container located at said inspection station and on said support means; and
f. signal means cooperating with said shaft and rod to indicate a container with a defective pushup.

10. The apparatus of claim 9, including a probe tip mounted on the upper end of said threaded rod for nondestructive contact with the bottom of glass containers.

11. The apparatus of claim 9, further including:
a. an upper bracket mounted on the underside of said container support means;
b. a guide extending vertically through said upper bracket and through said container support means;
c. said hollow shaft being made of electrically conductive material;
d. a probe tip mounted on the upper end of said threaded rod for nondestructive contact with the bottom of glass containers;
e. a radially extending flange formed on the lower portion of said shaft;
f. switch contact support means mounted below said upper bracket, formed with a guide therein for slidable engagement with the lower portion of said shaft, said switch contact support means formed from material having electrical insulating properties;
g. means on said switch contact support means for vertically biasing said flange, said hollow shaft, and said rod upwards;
h. adjustable stop means mounted in said swtich contact support means and positioned to contact the upper surface of said flange and position said hollow shaft and rod vertically against said biasing means, said biasing means thereby acting between said switch contact support means and said flange; and
i. adjustable sensing switch means positioned to complete an electrical circuit should said rod and hollow shaft and flange be depressed downward against said biasing means beyond a predetermined distance, that distance determined by subtracting the minimum allowable height of a container bottom pushup above said container support means from the level beyond said minimum allowable pushup height to which said shaft, rod, and probe tip will be moved by said elevating means.

12. The apparatus of claim 11, wherein said vertical biasing means comprises a coiled spring acting between said lower bracket and the bottom surface of said flange.

13. The apparatus of claim 11, wherein said adjustable stop means comprises an adjustable set screw positioned downward to contact the upper surface of said flange, said set screw mounted in said switch contact support means and extending downward therefrom.

14. The apparatus of claim 11, wherein said adjustable sensing switch means comprises:
a. an adjustable set screw of electrically conductive material positioned on said switch contact support means below the lower surface of said flange a distance determined by subtracting the minimum allowable height of a container bottom pushup above said container support means from the level beyond said minimum allowable pushup height to which said shaft, rod, and probe tip will be moved by said elevating means; and
b. electrical contact means on the lower extremity of said threaded rod electrically connected in series circuit arrangement to a voltage source, said source similarly connected to said adjustable set screw, the circuit therein completed through said threaded rod into said hollow shaft and flange to said adjustable set screw when said threaded rod and hollow shaft are depressed against said biasing means by a rejectably flat container pushup as said probe means is moved upwards by said elevating means.

15. The apparatus of claim 9, wherein said elevating means comprises:
a. a bracket mounted on the underside of said container support means;
b. a shaft rotatably mounted in said second bracket and extending horizontally therefrom;
c. crank means attached to said shaft for rotation of said shaft;
d. rotating cam means, said cam means indexing with the rotation of said indexing head;
e. a pushrod hingedly connected to said crank means extending to and communicating with said rotating cam means and reciprocating as said cam means changes position, said reciprocating action thereby causing an oscillating motion in said crank means, the oscillating motion being in magnitude proportional to the shape of said cam means;
f. arm means mounted on said horizontal shaft, extending horizontally from and perpendicular to said horizontal shaft, for angular movement in a vertical plane with rotation of said shaft; and
g. probe support hanger means hingedly attached to said arm means and extending downward therefrom for vertical movement with rotation of said horizontal shaft and angular displacement of said arm means by said crank means communicating with said cam means, said hollow shaft and rod hingedly attached to said probe support hanger means extending upwardly through said container support means, said hollow shaft and rod thereby capable of vertical sliding movement, without horizontal displacement, upon rotation of said horizontal shaft, the vertical movement predetermined by the design of said cam means to locate the upper end of said rod a fixed distance above the top surface of said container support means when a container is in inspection alignment, said fixed distance being greater than the minimum allowable height of a container pushup above said container support means, and retract said hollow shaft and rod to a height no higher than the level of the container support means so as to avoid contact with a container during indexing.

* * * * *